Aug. 22, 1967   N. H. MAYHEW   3,337,210
SELF-EXTENDING CLAMP
Filed April 5, 1965
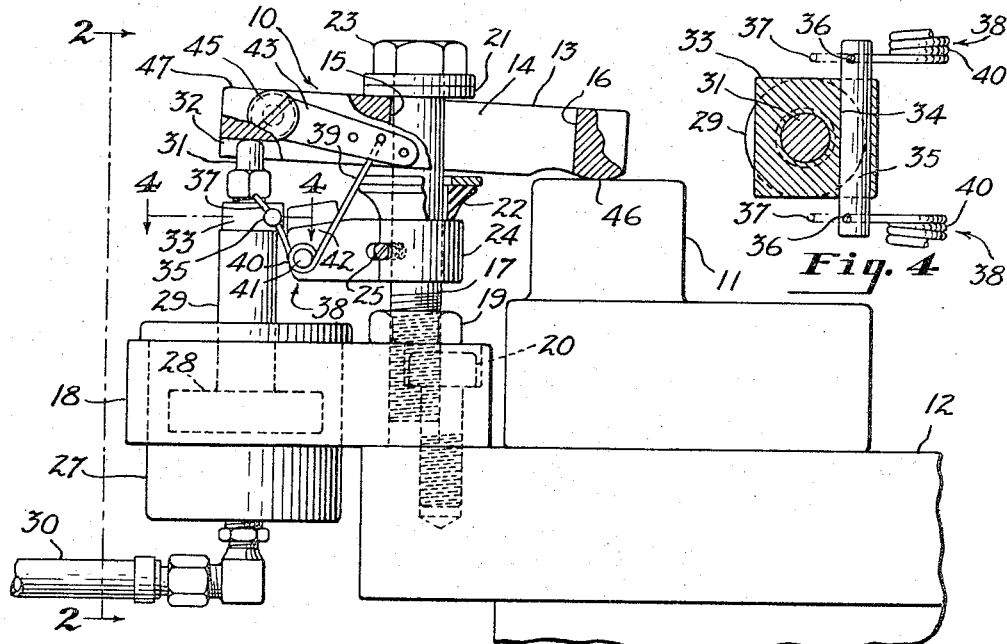
Fig. 1
Fig. 4
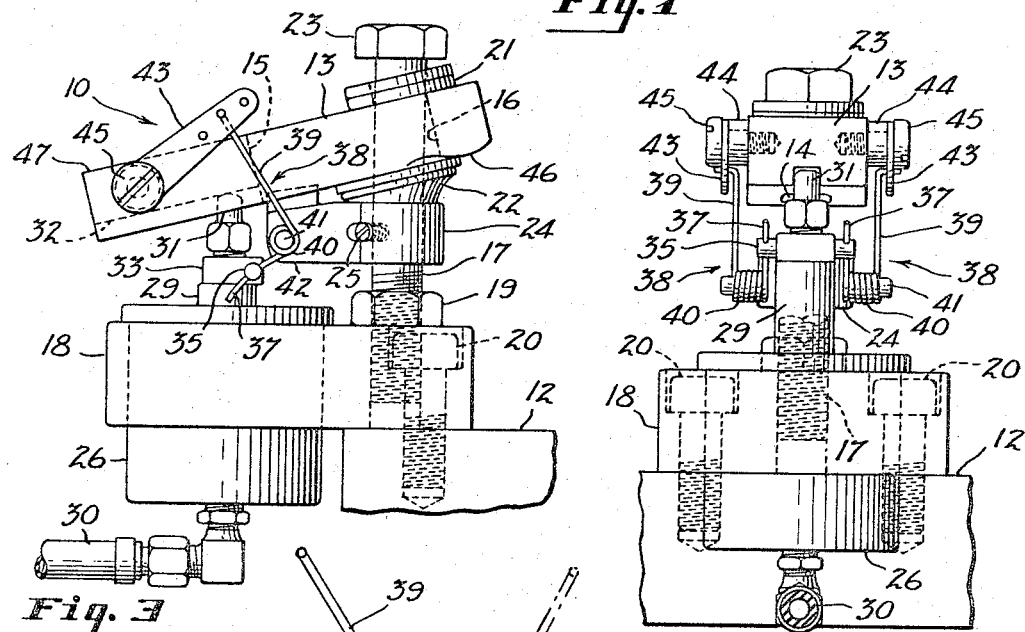
Fig. 3
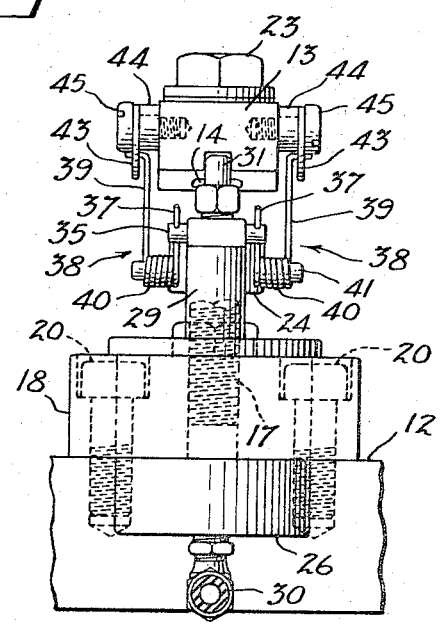
Fig. 2
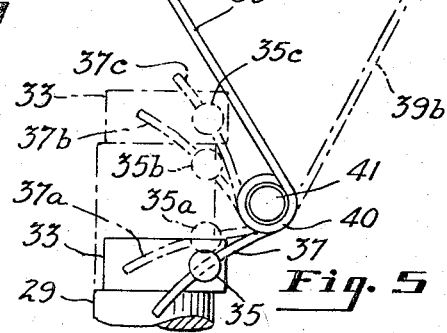
Fig. 5
INVENTOR
Norman H. Mayhew
BY McNenny, Farrington,
Pearne & Gordon
ATTORNEYS

3,337,210
SELF-EXTENDING CLAMP
Norman H. Mayhew, Cleveland, Ohio, assignor to Jergens Tool Specialty Co., Cleveland, Ohio, a corporation of Ohio
Filed Apr. 5, 1965, Ser. No. 445,558
3 Claims. (Cl. 269—94)

This invention relates to clamps and, more particularly, to clamps for clamping a workpiece on a working table.

In one of their simplest forms, machine tool clamps for clamping a workpiece to a machine table comprise a strap having a slot through which a threaded pin projects. One end of the strap rests upon a second pin and the other end of the strap applies clamping pressure to the workpiece when a nut is threaded onto the first-mentioned pin to apply pressure to a central portion of the strap. These clamps are relatively inexpensive, and are suitable for short run machining operations.

The setup time required to properly position these straps on a workpiece is a considerable portion of the time required for the entire machining cycle. For production machining operations or other work wherein the same or similar operations are repetitively performed on a series of workpieces and a uniform clamping pressure is desired, fluid-operated clamps have been proposed. These clamps include a pivoted rocking arm having a workpiece clamping end and an opposite end which is engaged by a hydraulic ram. The force exerted by the hydraulic ram is transmitted to the clamping end to exert a predetermined clamping force on the workpiece.

These hydraulic rams are provided with means to permit the rocking arm to be cleared from the machine bed so that the workpiece may be loaded onto the bed or removed from the bed. In some instances, a simple pivotal connection is provided so that the rocking arm may be swung away from the bed by hand. Such a hand operation, however, increases the non-productive cycle of the machine and limits the number of machines that a single operator can handle. Other fluid-operated clamps include a second hydraulic ram for swinging the rocker arm toward and away from the workpiece or for pushing the rocker arm toward the workpiece.

The fluid-operated clamps that include a second hydraulic ram for initially positioning the clamping end of the rocker arm over the workpiece and for clearing the workpiece after the machining operation are relatively expensive and complex. The clamp according to the present invention, however, includes all the desirable features of a clamp having a hydraulic ram for applying clamping force and a second hydraulic ram for clearing the machine bed, but which eliminates one of the hydraulic rams to perform both the clamping and clearing operations with a single actuating means and a simple mechanical linkage.

It is accordingly a general object of the present invention to provide a clamp which has a strap that is guided for longitudinal pitching and sliding movement from a retracted position at which the clamping end of the strap is drawn up and back from the workpiece to an extended position at which the clamping end of the strap is forced forward to a predetermined extent and down to the extent necessary to clamp the workpiece, all in response to a single actuating means.

It is a further object of this invention to provide a clamp for clamping a workpiece to a working table which is inexpensive and which may be constructed by modifying existing clamps.

These and other objects and advantages of the invention will hereinafter become apparent from a consideration of the following detailed description and drawings.

In the drawings:

FIG. 1 is an elevational view, partly in section, of a clamp according to this invention;

FIG. 2 is a cross sectional view, the plane of the section being indicated by the line 2—2 in FIG. 1;

FIG. 3 is an elevational view, similar to FIG. 1, but showing the clamp in a different operational position;

FIG. 4 is a cross sectional view, the plane of the section being indicated by the line 4—4 in FIG. 1; and FIG. 5 is a partly schematic, elevational view of the linkage means according to this invention.

Referring now to the drawings, a clamp 10 is illustrated. The clamp 10 may be employed for clamping a workpiece 11 on a working table 12. The clamp 10 comprises a strap 13 having a longitudinal slot 14 formed therein. The slot 14 is bounded on its ends by faces 15 and 16. A guidepost or stud 17 extends through the slot 14 and is threaded into a clamp base 18 at its lower end. A nut 19 is threaded onto the stud 17 and against the base 18 so that the vertical height of the stud 17 may be adjusted. The base 18 is fixed to the table 12 by bolts 20. Upper and lower guide pads 21 and 22, respectively, are provided on the post 17 to provide sliding surfaces for the strap 13. The guide pads 21 and 22 are mounted between a top nut 23 which is threaded onto the upper end of the post 17 and a bushing 24. The bushing 24 is mounted in a preselected position on the post 17 and is retained in its preselected position by a setscrew 25.

A hydraulic cylinder 26 is mounted in the base 18 so that its upper end projects through the base 18. A piston 28 having a ram 29 is slidably mounted in the cylinder 27. The piston 28 and its ram 29 may be raised and lowered by admitting and exhausting fluid in the cylinder beneath the ram through a conduit 30. The ram 29 comprises a first linkage means and its upper end is provided with a pin 31 which engages a groove 32 in the lower face of the strap 13. A collar 33 is threaded onto the ram 29 and the collar 33 is provided with a bore 34. A pin 35 extends through the bore 34 and each end of the pin is drilled to provide a hole 36. Each hole 36 slidably receives one arm 37 of a pair of spaced bell crank elements 38. Each bell crank element 38 includes one arm 37, a second arm 39, and a central element 40. Each central element 40 comprises a coil spring which is loosely wrapped around the projecting end of a pin 41. The pin 41 extends through and is fixed to a projecting portion 42 of the collar 24.

Each arm 39 of the bell crank mechanisms 38 pivotally engages one end of one of a pair of links 43. The links 43 are pivotally mounted on opposite sides of the strap 13 between a bushing 44 and the head of a bolt 45.

To clamp the workpiece 11 to the table 12, the ram 29 is retracted, as is shown in FIG. 3. In the position illustrated in FIG. 3, the clamp 10 is in a retracted position at which a clamping end 46 of the strap 13 is drawn up and back from the workpiece 11. To guide the strap 13 for longitudinal pitching and sliding movement from its retracted position to an extended position at which the clamping end 46 of the strap 13 is forced forward to a predetermined extent and down to the extent necessary to clamp the workpiece 11, fluid is admitted into the cylinder 27 to move the ram 29 upwardly. As the ram 29 moves upwardly, it moves a driving end 47 of the strap 13 upwardly to drive the strap in its pitching motion. During this pitching motion, the strap is guided by means of the engagement between the groove 32 and the end 31 of the ram 29 and by means of the engagement between the post 17 and the slot 14.

The strap is driven in its sliding motion toward the workpiece 11 by a second linkage means coupled to the first linkage means. The second linkage means includes the bell crank elements 38 and the links 43. Thus, as is illustrated schematically in FIG. 5, the upward movement of the ram 29 causes the arms 37 and 39 and the central element 40 to be pivoted in a clockwise direction about the pin 41. As the arms 39 swing in this direction, they pull the links 43, and therefore the strap 13, toward and over the workpiece 11.

The strap 13 is drawn toward the workpiece in this manner until the face 15 of the slot 14 engages the guidepost 17. The height of the guidepost 17 is readjusted by the nut 19 so that the face 15 engages the guidepost 17 prior to engagement of the workpiece 11 with the clamping end 46 of the strap 13. The sliding motion of the strap 13 is thereby limited when the strap is in its clamping position above the workpiece. Continued movement of the ram 29 upwardly, however, pitches the clamping end of the strap downwardly to engage the workpiece 11. Since this final upward movement of the ram 29 cannot be transmitted to the linkage means that transmit sliding movement to the strap 13, a lost motion action is provided in the mechanism.

As is illustrated in solid outline in FIG. 5, the ram 29, the arms 37, and the arms 39 are all in their retracted positions. When the ram 29 is raised to an elevation wherein the pin 35 reaches the position illustrated as 35b and the arms 37 and 39 are in the position illustrated as 37b and 39b, respectively, the face 15 butts against the guidepost 17. In this position, the sliding motion of the strap 13 ceases and the clamping end 46 of the strap is spaced over the portion of the workpiece that is to be clamped. The ram 29 continues its travel, however, and moves the pin 35 to the position illustrated as 35c in FIG. 5. In this position, the arms 37 are moved to the position illustrated as 37c. Since the face 15 is against the post 17 during this additional travel of the ram 29, the arms 39 remain in the position illustrated as 39b, and the additional movement of the arms 37 from the position 37b to the position 37c is permitted by the coil spring 40. The further travel of the ram 29 in this manner causes the clamping end 46 of the strap 13 to pitch downwardly and clamp the workpiece 11.

The movement of the strap 13 to its retracted position is similar in that the clamping end 46 is first pitched away from the workpiece 11 during the initial retraction of the ram 29 and the strap is then guided to its fully retracted position as the ram 29 is lowered into its cylinder 26. When the arms 39 reach the position illustrated in FIG. 5, however, the face 16 butts against the guidepost 17. This occurs, however, before the ram 29 is fully retracted and when the pin 35 and the arms 37 are in the position illustrated as 35a and 37a, respectively. Thus, during the final increment of retraction of the ram 29, the arms 37a and the pin 35a are moved to their solid outline position. The arms 39 remain in their solid outline position, since the face 16 butts against the guidepost 17 to prevent further sliding of the strap 13. This additional movement of the arms 37 loads the springs 40 to insure that the strap is fully retracted.

Thus, the strap 13 engages the workpiece without any sliding movement that may damage the surface of the workpiece or move the workpiece from its preselected position on the working table. Similarly, the strap 13 is removed from the workpiece without any sliding movement.

The invention is not restricted to the slavish imitation of each and every one of the details described above, which have been set forth merely by way of example, with the intent of most clearly setting forth the teaching of the invention. Obviously, devices may be provided which change, eliminate, or add certain specific structural details without departing from the invention.

What is claimed is:

1. A clamp for clamping a workpiece on a working table, comprising a strap having a clamping end and an opposite driving end, means for mounting said strap on the working table, said mounting means including means for guiding the strap for longitudinal pitching and sliding movement from a retracted position at which the clamping end of the strap is drawn up and back from the workpiece to an extended position at which the clamping end of the strap is forced forward to a predetermined extent and down to the extent necessary to clamp the workpiece, actuating means for applying driving forces to the driving end of the strap, said mounting means including stop means for limiting the forward movement of the strap, said actuating means including first linkage means for driving the strap in its pitching motion and second linkage means for driving the strap in its sliding motion, the input end of the second linkage means being coupled to the first linkage means, the second linkage means including yielding elements which transmit driving power via said second linkage means to slide said strap but which yield to provide a lost motion action as the sliding motion of the strap is limited when said strap engages the stop means and said first linkage means continues to drive the clamping end of the strap downwardly.

2. A clamp for clamping a workpiece on a working table comprising a strap having a clamping end and an opposite driving end, means for mounting said strap on the working table, said mounting means including means for guiding the strap for longitudinal pitching and sliding movement from a retracted position at which the clamping end of the strap is drawn up and back from the workpiece to an extended position at which the clamping end of the strap is forced forward to a predetermined extent and down to the extent necessary to clamp the workpiece, actuating means for applying driving forces to the driving end of the strap, said mounting means including stop means for limiting the forward movement of the strap, said actuating means including first linkage means for driving the strap in its pitching motion and second linkage means for driving the strap in its sliding motion, the input end of the second linkage means being coupled to the first linkage means, the second linkage means constituting motion multiplying means and including yielding elements which transmit driving power via said second linkage means to slide said strap but which yield to provide a lost motion action as the sliding motion of the strap is limited when said strap engages said stop means and said first linkage means continues to drive the clamping end of the strap downwardly.

3. A clamp for clamping a workpiece on a working table comprising a strap having a clamping end and an opposite driving end, means for mounting said strap on the working table, said mounting means including means for guiding the strap for longitudinal pitching and sliding movement from a retracted position at which the clamping end of the strap is drawn up and back from the workpiece to an extended position at which the clamping end of the strap is forced forward to a predetermined extent and down to the extent necessary to clamp the workpiece, actuating means for applying driving forces to the driving end of the strap, said mounting means including stop means for limiting the forward movement of the strap, said actuating means including first linkage means for driving the strap in its pitching motion and second linkage means for driving the strap in its sliding motion, the input end of the second linkage means being coupled to the first linkage means, the second linkage means including yielding elements which transmit driving power via said second linkage means to slide said strap but which yield to provide a lost motion action as the sliding motion of the strap is limited when said strap engages the stop means and said first linkage means continues to drive the clamping end of the strap downwardly, said second linkage means including a bell crank element means having a coil spring as a central element.

References Cited

UNITED STATES PATENTS

| | | | |
|---|---|---|---|
| 2,627,210 | 2/1953 | Kear | 269—94 X |
| 2,908,205 | 10/1959 | Furman et al. | 269—94 X |
| 3,222,054 | 12/1965 | Bisulca et al. | 269—93 |

ROBERT C. RIORDON, *Primary Examiner.*

J. F. McKEOWN, *Assistant Examiner.*